United States Patent [19]

Ausilio

[11] Patent Number: 4,847,467
[45] Date of Patent: Jul. 11, 1989

[54] LASER WELDING CLAMP
[75] Inventor: John S. Ausilio, Mt. Clemens, Mich.
[73] Assignee: Colt 7 Inc., Fraser, Mich.
[21] Appl. No.: 233,739
[22] Filed: Aug. 19, 1988
[51] Int. Cl.[4] .............................................. B23K 26/00
[52] U.S. Cl. ............................ 219/121.63; 219/121.6; 219/161
[58] Field of Search ........... 219/121.6, 121.63, 121.64, 219/121.67, 121.72, 121.78, 121.79, 121.45, 121.46, 121.58, 161, 121.85, 121.82

[56] References Cited

U.S. PATENT DOCUMENTS

| | | | |
|---|---|---|---|
| 2,106,987 | 2/1938 | Powell | 113/98 |
| 2,696,547 | 12/1954 | Felton et al. | 219/17 |
| 3,788,634 | 1/1974 | Chauvet et al. | 269/154 |
| 4,223,201 | 9/1980 | Peters et al. | 219/121 |
| 4,461,946 | 7/1984 | Kratschmer | 219/121 |
| 4,658,110 | 4/1987 | Miller et al. | 219/121.64 X |
| 4,697,061 | 9/1987 | Spater et al. | 219/121.64 |

Primary Examiner—C. L. Albritton
Attorney, Agent, or Firm—Basile & Hanlon

[57] ABSTRACT

A clamp for laser welding operations includes a solid member having at least one aperture extending completely therethrough. A portion of the solid member surrounds the entire periphery of the aperture. A connector is attached to the solid member for connecting the solid member to a moving device which moves the solid member between unclamping and clamping positions. The solid member, when in the clamping position, engages a stack of metal sheets under pressure and urges the metal sheets together against an underlying backup into continuous contact along the length of a weld site defined by the peripheral extent of the aperture in the solid member.

13 Claims, 2 Drawing Sheets

LASER WELDING CLAMP

BACKGROUND OF THE INVENTION

1. Field of the Invention:

The present invention relates, in general, to welding apparatus and, more specifically, to clamps for clamping parts or metal sheets together for welding.

2. Description of the Prior Art:

Welding is commonly employed as an assembly method for joining several metal parts or sheets together into an assembly. Various welding methods are available, such as arc and resistance spot welding.

Resistance spot welding is widely employed in vehicle assembly to join together several metal sheets or sub-assemblies into a larger assembly. Resistance spot welding utilizes a pair of electrodes which are positioned on opposite sides of the parts or metal sheets which are to be welded. The electrodes are brought together under high pressure to force the parts into contact at the area of weld between the electrode tips before a high electric current is passed through the tips creating a molten zone of metal which, after cooling, solidifies to a solid weld nugget joining the parts or sheets together.

Clamps of various types are employed to hold the parts together in position before and during such welding operations. Such clamps include a clamp member configured to the shape of one or more of the parts so as to engage the parts and hold them in a fixed position relative to other part(s). The clamp member is moved between unclamped and clamped positions by a variety of means including manually operated, over-center toggles and fluid operated cylinders.

While such clamps hold the parts together under pressure, the pressure is directed solely to prevent the parts from moving relative to each other. Such clamps function only as part positioning members with welding being performed adjacent to or in a location spaced from the portion of the clamp which engages the parts. Pressure at the weld site is not required in resistance spot welding to insure contact between the parts since the electrodes are brought together under pressure to urge the parts together and insure contact between the parts or metal sheets at the weld site.

Recently, laser welding has been developed which affords several advantages over other more conventional forms of welding. The sharp focusing of the laser beam allows a concentration of energy capable of providing faster welding with less heat being introduced into the surrounding portions of the parts. In laser welding, a beam of laser radiation is focused onto a weld site in a stack of metal sheets or metal thicknesses at a focal point within the lowermost sheet or part. This beam causes a molten zone of metal to be formed in the stack in a cone shape extending from the upper surface of the top most sheet to the focal point of the beam within the lowermost sheet in the metal stack. This molten zone, when cooled, solidifies to join the sheets together. The laser weld is generally formed in an elongated, thin line and a laser weld of approximately ¾ inch in length has been found to be equivalent in strength to a single weld nugget formed by resistance spot welding.

However, for the laser weld to be properly formed, the metal sheets must be in continuous contact along the entire length of the laser weld. Any gaps between the metal sheets caused by mispositioning of the sheets, misformed parts or bent parts results in no weld or a weld having insufficient strength. Thus, it is necessary that the metal sheets be in continuous contact along the entire length of the laser weld. Previously devised clamps for resistance spot welding and other welding operations are inadequate at insuring such continuous contact since the clamp engages the parts at a location separate or apart from the weld site and does not force the parts together in a stack between the clamp and an underlying solid backup. Further, laser welding lacks the pressure of the welding electrodes in resistance spot welding operations which insures complete metal contact between the parts at the weld site.

Thus, it would be desirable to provide a clamp for laser welding operations which insures complete and continuous contact between the metal sheets or parts along the entire length of the laser weld site. It would also be desirable to provide a clamp for laser welding which can be configured in a variety of shapes to conform to any desired weld pattern or part shape. It would also be desirable to provide a clamp for laser welding which is usable with conventional clamp operating devices, such as manually operated toggles or fluid operated cylinders.

SUMMARY OF THE INVENTION

The present invention is a clamp and clamp apparatus for use in laser welding operations which maintains a stack of metal sheets together in continuous contact along the entire length of the weld site.

The clamp includes a solid member having at least one aperture formed therein which extends completely through the solid member. A portion of the solid member surrounds the entire periphery of the aperture. A connector means is fixedly attached to the solid member for connecting the solid member to a clamp operating means, such as a manually operated toggle or a fluid operated cylinder, to move the solid member between unclamped and clamping positions.

The solid member, when in the clamping position, engages a stack of metal parts overlying a backup under pressure to urge the metal sheets into continuous contact with each other along the entire length of the weld site defined by the peripheral extent of the aperture in the solid member.

The solid member may include any number of apertures depending upon the shape of the parts being welded or the desired weld pattern. Further, the solid member may have any shape and either be planar or contoured so as to conform to the shape of the parts being welded.

The unique laser welding clamp of the present invention provides pressure around the entire periphery of the laser weld site which is sufficient to urge the metal sheets being welded into continuous contact along the entire length of the laser weld. This insures that a laser weld having sufficient strength is formed. The clamp may be provided in any number of shapes or configurations depending upon the shape of the parts being welded or the desired weld pattern. Further, the clamp is attachable to any conventional clamp operating device, such as a manually operated, over-center toggle or a fluid operated cylinder.

BRIEF DESCRIPTION OF THE DRAWING

The various features, advantages and other uses of the present invention will become more apparent by referring to the following detailed description and drawing in which:

FIG. 1 is a perspective view of the laser welding clamp of the present invention.

DESCRIPTION OF THE PREFERRED EMBODIMENTS

Figure 1:
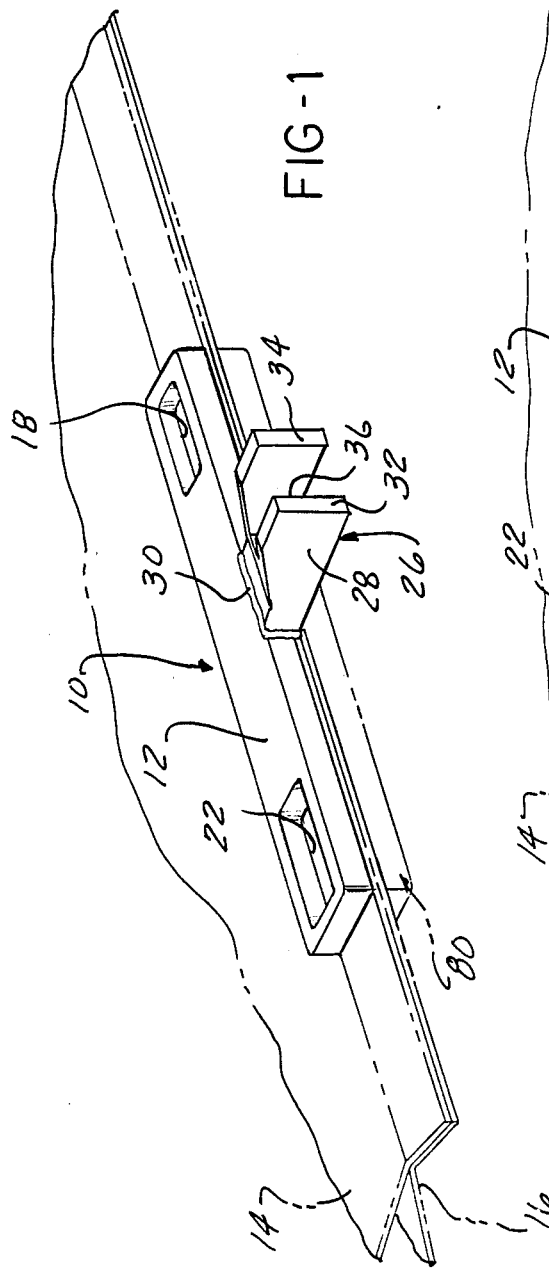

Throughout the following description and drawing, an identical reference number is used to refer to the same component shown in multiple figures of the drawing.

Figure 2:
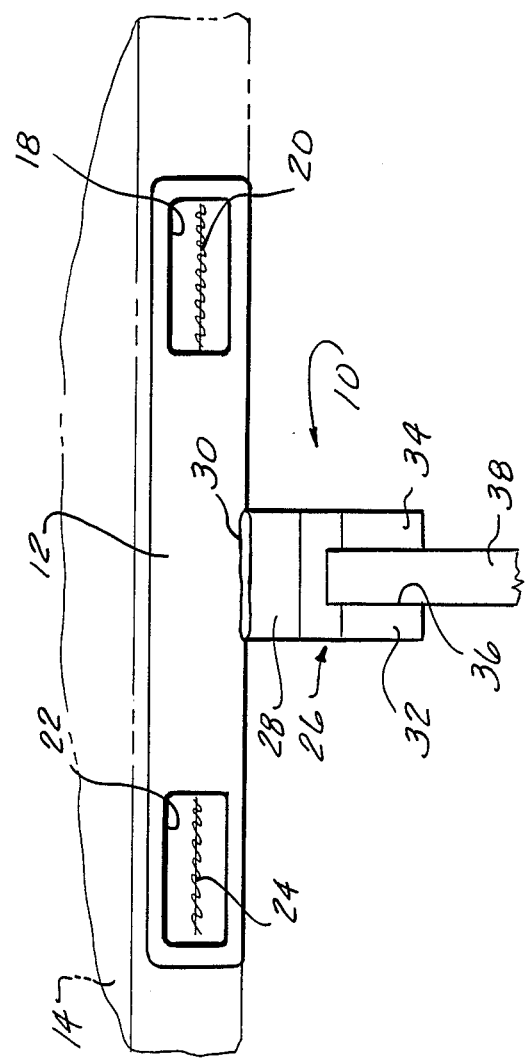
FIG. 2 is a plan view of the laser welding clamp shown in FIG. 1.
Figure 3:
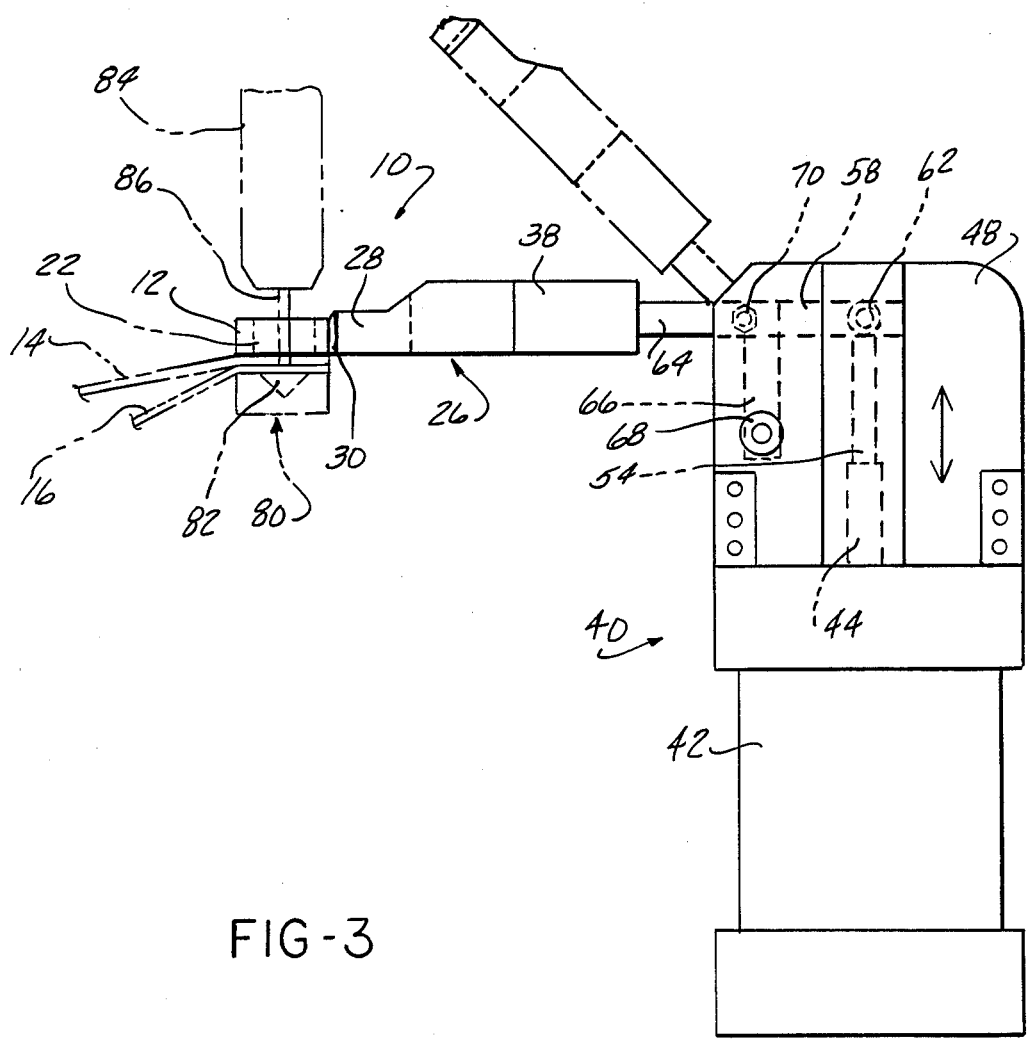
FIG. 3 is a side elevational view of the laser welding clamp of the present invention showing this attachment to a clamp operating means.

Referring now to FIGS. 1, 2 and 3 of the drawing, there is illustrated a clamp apparatus 10 usable in laser welding operations to securely hold a stack of metal sheets together in continuous contact during laser welding. The clamp apparatus 10 includes an elongated solid clamp member 12 having a form configured to the shape of the parts being welded or the desired weld pattern in such parts. By way of example only, the solid member 12 is illustrated as having a planar, elongated substantially rectangular form as shown in FIGS. 1 and 2. It will be understood that the solid member 12 may have any other shape, such as a planar, curved shape or a contoured, non-planar form depending upon the shape of the parts being welded. The solid member 12 shown in FIGS. 1 and 2 is configured for use in clamping a plurality of metal sheets 14 and 16 having planar outer edges or flanges. The clamp apparatus 10 is usable with any metal thickness buildup, with the amount of metal thickness being determined solely by the welding capacity of the laser weld apparatus.

It will be understood that the term "stack of metal sheets" is meant to include planar sheets, contoured or shaped metal parts or combinations thereof which present a buildup of metal layers at a weld site.

The solid member 12 is formed of a high strength material which resists distortion from the heat generated during the laser welding operation. For example, steel may be employed to form the solid member 12.

At least one aperture 18 is formed in the solid clamp member 12. The aperture 18 may have any desired configuraton, such as a rectangular, square or circular slot. The aperture 18 extends completely through the solid member 12 and its peripheral extent defines the weld location or site denoted by reference number 20 in FIG. 2.

The aperture 18 defines a weld site 20 by providing an opening through which a focused beam of laser radiation, as described hereafter, may pass from a laser welding apparatus onto the stack of metal sheets 14 and 16 to form a laser wled denoted by reference number 20 in FIG. 2 thereby joining the sheets 14 and 16 into a unitary structure at their flanges or edges.

At least one and preferably a plurality of slots, such as slots 18 and 22 as shown in FIGS. 1 and 2, are formed in the solid member 12. In the example illustrated in FIGS. 1 and 2, the clamp apparatus 10 includes two separate weld sites 20 and 24. It will be understood that any number of separate apertures may be formed in a single solid clamp member 12 or one enlarged aperture extending substantially along the entire length of the solid clamp member 12 may also be employed depending on the desired weld pattern. Further, a plurality of separate solid members 12 may be aligned edge to edge to form a number of successive, spaced welds in the stack of metal sheets 14 and 16.

As shown in FIGS. 1 and 2, a portion of the solid clamp member 12 surrounds the entire peripheral extent of each aperture 18 and 22. This provides pressure around the entire peripheral extent of each weld site 20 and 24 which forces the metal sheets 14 and 16 together in secure continuous contact along the entire length of each weld site 20 and 24 to enable a proper laser weld having the requisite high strength to be formed in the sheets 14 and 16.

The clamp 10 also includes connector means denoted in general by reference number 26 for connecting the solid clamp member 12 to a conventional clamp operating means described hereafter. The connecting means 26 may have any shape, such as the shape illustrated in FIGS. 1 and 2 which includes a solid end portion 28 fixedly secured by any suitable means, such as by welding 30, to the solid clamp member 12. A pair of spaced arms 32 and 34 extend integrally from the solid end portion 28 of the connector means 26 and define a recess 36 therebetween which receives one end of an arm 38. The arm 38 is attached to the arms 32 and 34 by any suitable means, such as by welding, not shown, or by separate fastener means, also not shown.

Figure 4:
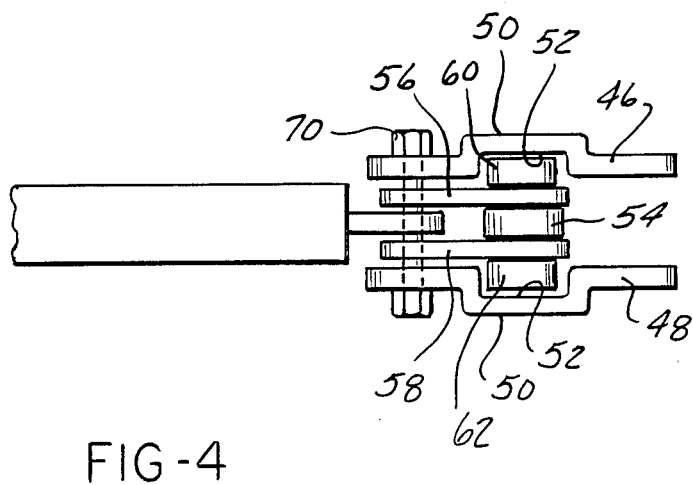
FIG. 4 is a plan view of the clamp operating means shown in FIG. 3.

The laser welding clamp apparatus 10 also includes, by way of example, a clamp moving means denoted in general by reference number 40 and shown in FIGS. 3 and 4.

The moving means 40 described hereafter is by way of exmaple as any suitable type of clamp moving means, such as a manually operated, over-center toggle may be employed to move the clamp apparatus 10 between an unclamped position shown in phantom in FIG. 3 and a clamped position, shown in solid and described in detail hereafter.

By way of example only, the moving means 40 comprises a conventional fluid operated cylinder 42 which includes an internally disposed movable piston. A piston rod 44 is attached to one end of the piston and extends outward from the cylinder 42. A housing formed of two spaced plate members 46 and 48 is joined to an extends upward from one end of the cylinder 42. The plate members 46 and 48 have a centrally located enlarged portion 50 which creates an internally disposed channel 52.

A shaft 54 is affixed to by welding or threading to one end of the piston rod 44 and extends outward therefrom. A pair of links 56 and 58 are attached to the upper end of the shaft 54. Further, a pair of cam rollers 60 and 62 are rotatably mounted about the upper end of the shaft 54 at the innerconnection of the shaft 44 and the links 56 and 58. The rolers 60 and 62 move within the channel 52 formed in the plates 46 and 48 of the housing.

An L-shaped link 64 is pivotally mounted at a pivot point 68 at the bottom of a base leg 66 to the housing plates 46 and 48 as shown in FIG. 3. The other leg of the L-shaped link 64 is attached by suitable fastening means 70 to the links 56 and 58. The outer end of the L-shaped link 64 is secured to the arm 38 by suitable means, such as threading or welding.

In operation, the fluid operated cylinder 64 causes extension and retraction of the piston rod 44 depending upon the direction of fluid flow into and out of the cylinder 42. This causes a back and forth movement of the shaft 54 between the plates 46 and 48.

In FIG. 3, the clamp apparatus 10 is illustrated in solid in its clamping position. In this position, the cylinder piston rod 44 is extended such that the cam rollers 60 and 62 are positioned at the upper end of the housing plates 46 and 48. A retract fluid flow within the cylinder 42 causes retraction of the piston rod 44 and the attached shaft 54. This retracts the L-shaped link 64 causing it to pivot about its pivot point 68. This pivoting movement of the L-shaped link 64 upon retraction of the links 56 and 58 and the shaft 54 attached to the piston rod 44 causes the solid clamp member 12 to pivot away from the stack of metal sheets 14 and 16 to an unclamped position, shown in phantom, allowing removal of the stack of metal sheets and the insertion of new, loose sheets for the next welding operation.

As shown in FIGS. 1 and 3, the clamp apparatus 10 also includes a solid backup denoted in genral by reference number 80. The backup 80 is securely mounted on the tool or fixture to which the clamp apparatus 10 is associated and is constructed in substantially the same form as the elongated solid member 12. The purpose of the backup 80 is to provide support for the stack of metal sheets 14 and 16 during the welding operation and in combination with the pressure applied by the solid member 12 maintains the sheets 14 and 16 in continuous contact along the length of the weld.

As shown in FIG. 3, the backup 80 is provided with a centrally located recess 82. The recess 82 is positioned below the weld sites, denoted by reference numbers 20 and 24 in FIG. 2, and provides a relief or opening to prevent welding of the metal sheet 16 to the tool fixture in which the clamp apparatus 10 is mounted. As shown in FIG. 3, the recess 82 preferably has an open ended, outwardly extending conical shape; although other shapes, such as square, etc., may also be employed.

In a complete operation of the clamp apparatus 10, the metal sheets 14 and 16 are initially positioned over the solid backup 80. The clamp apparatus 10 is then moved into its clamping position with the solid member 12 engaging the upper surface of the top sheet 14 under pressure by extension of the piston rod 44 of the fluid cylinder 42 as described above.

A laser welding head denoted by reference number 84 is positioned over the solid member 12 and generates a laser beam 86 which is focused onto the stack of metal sheets 14 and 16 through the aperture 18 or 22 in the solid member 12. The beam 86 has its focal point located within the thickness of the lowermost metal sheet 16.

As is conventional, the laser head apparatus 84 is mounted to suitable devices to effect movement along each weld site and between adjacent, spaced, weld sites. Such a mechanism may include manual means or automatic means, such as a robotic device activating a stored control program defining the path of movement of the laser head 84 as well as the sequence of operation of the laser in generating the beam 86 to form the welds 20 and 24 at the desired locations in the stack of metal sheets 14 and 16.

In summary, there has been disclosed a unique clamp for laser welding operations which insures continuous contact between a stack of metal sheets or parts along the entire length of the laser weld. The clamp may have many different forms depending upon the shapes of the parts being welded or the desired weld parttern or location of welds. By providing a portion of the clamp around each weld site, secure continuous contact between the metal sheets or parts is insured to thereby effectively form a high strength laser generated weld in a stack of metal sheets.

What is claimed is:

1. A clamp for use in laser welding in which a weld is formed at a weld site in a stack of metal sheets by a focused beam of laser radiation and the clamp is moved by a moving means from an unclamped position to a clamped position engaging the stack of metal sheets under pressure, the clamp comprising:
    a solid member configured to continuously engage the stack of metal sheets and surround the weld site when in the clamped position; and
    an aperture formed in and surrounded in its entire periphery by the solid member and disposable over the weld site.

2. The clamp of claim 1 further including:
    means, fixedly attached to the solid member, for attaching the solid member to a clamp moving means.

3. A clamp for use in laser welding in which a weld is formed at a weld site in a stack of metal sheets by a focused beam of laser radiation and the clamp is moved by a moving means from an unclamped position to a clamped position engaging the stack of metal sheets under pressure, the clamp comprising:
    a solid member configured to continuously engage the stack of metal sheets and surround the weld site when in the clamped position; and
    a plurality of apertures formed in the solid member and disposable over separate weld sites.

4. The clamp of claim 1 wherein the solid member surrounds the entire periphery of the aperture formed in the solid member.

5. A laser welding clamp apparatus for forming a laser weld in a stack of metal sheets by a focused beam of laser radiation comprising:
    a solid backup underlying a stack of metal sheets;
    a solid clamp member;
    an aperture formed in and extending through the solid clamp member and forming an opening surrounded along its entire periphery by the solid member through which the beam of laser radiation is directed into the stack of metal sheets; and
    means for moving the clamp member from an unclamped position to a clamped position in which the clamp member engages the stack of metal sheets under pressure and urges the stack of metal sheets continuously together along the length of the weld.

6. The laser welding clamp apparatus of claim 5 wherein a portion of the clamp member surrounds the entire periphery of the aperture formed in the clamp member.

7. A laser welding clamp apparatus for forming a laser weld in a stack of metal sheets by a focused beam of laser radiation comprising:
    a solid backup underlying a stack of metal sheets;
    a solid clamp member;
    an aperture formed in and extending through the solid clamp member and forming an opening through which the beam of laser radiation is directed into the stack of metal sheets; and
    means for moving the clamp member from an unclamped position to a clamped position in which the clamp member engages the stack of metal sheets under pressure and urges the stack of metal sheets continuously together along the length of the weld, the moving means comprising:

a fluid operated cylinder; and a linkage attached to the cylinder and the solid clamp member.

8. The laser welding apparatus of claim 7 further including:

means, fixedly attached to the solid clamp member, for connecting the clamp member to the linkage.

9. The laser welding apparatus of claim 8 wherein the connecting means comprises:

an arm fixedly attached to the clamp and connected to the linkage.

10. A laser welding clamp apparatus for forming a laser weld in a stack of metal sheets by a focused beam of laser radiation comprising:

a solid backup underlying a stack of metal sheets;

a solid clamp member;

a plurality of apertures formed in and extend through the solid clamp member forming openings through which the beam of laser radiation is directed into the stack of metal sheets; and means for moving the clamp member from an unclamped position to a clamped position in which the clamp member engages the stack of metal sheets under pressure and urges the stack of metal sheets continuously together along the length of the wled.

11. The laser welding clamp apparatus of claim 5 wherein the backup comprises:

a solid strip; and an open-ended, outwardly facing recess formed in the solid strip.

12. The clamp of claim 1 wherein the aperture is an elongated slot having a length greater than its width.

13. The laser welding clamp apparatus of claim 5 wherein the moving means comprises:

linkage means, movable between first and second positions corresponding to the unclamped and clamped positions of the clamp member, respectively.

* * * * *